United States Patent [19]
Brodrecht

[11] Patent Number: 5,469,693
[45] Date of Patent: Nov. 28, 1995

[54] BALE BAGGING APPARATUS

[76] Inventor: Gerald Brodrecht, R.R. #1, Thorsby, Alberta, Canada, T0C 2P0

[21] Appl. No.: 395,659

[22] Filed: Feb. 28, 1995

Related U.S. Application Data

[63] Continuation of Ser. No. 124,078, Sep. 21, 1993, abandoned.
[51] Int. Cl.$^6$ ................................................. B65B 43/42
[52] U.S. Cl. ................... 53/567; 53/257; 53/261; 53/576
[58] Field of Search .............. 100/65, 100; 53/257, 53/261, 262, 459, 530, 567, 576

[56] References Cited

U.S. PATENT DOCUMENTS

| | | | |
|---|---|---|---|
| 231,215 | 8/1880 | Dederick | 53/530 X |
| 2,885,850 | 5/1959 | Smith | 53/261 X |
| 2,901,875 | 9/1959 | Hultkrans et al. | 53/261 |
| 2,946,166 | 7/1960 | Baxter | 53/530 |
| 3,011,297 | 12/1961 | McDevitt | 53/261 |
| 3,104,609 | 9/1963 | Crawford | 53/530 X |
| 3,473,291 | 10/1969 | Raymond et al. | 53/530 |
| 4,133,164 | 1/1979 | Mintz | 53/261 |
| 4,606,176 | 8/1986 | Cundall | 53/567 |
| 4,686,817 | 8/1987 | Brodrecht et al. | 53/567 |
| 4,888,937 | 12/1989 | Glenn | 53/459 X |
| 4,945,715 | 8/1990 | Brodrecht | 53/261 X |
| 5,016,424 | 5/1991 | Stirling | 53/459 |
| 5,140,802 | 8/1992 | Inman et al. | 53/459 |
| 5,220,772 | 6/1993 | Koskela et al. | 53/570 X |

FOREIGN PATENT DOCUMENTS 9107867  6/1991  WIPO ........................... 53/567

*Primary Examiner*—John Sipos
*Assistant Examiner*—Daniel Moon
*Attorney, Agent, or Firm*—Murray E. Thrift; Adrian D. Battison

[57] ABSTRACT

A bale bagging method and apparatus are disclosed. Bales are passed through a collapsible tunnel, preferably formed of panels of flexible, yet self-supporting plastic material. A plastic film tube is supported on the tunnel as the bales are passed through. The tube has the same circumference as the bales so that the tunnel is held tightly against the bales. At the rear end of the tunnel is a retaining hoop over which the tube is stretched. Once the tube passes over the hoop, it contracts onto the bale to fit very tightly onto the bale, thus minimizing wind fatigue in the bag.

12 Claims, 3 Drawing Sheets

5,469,693

BALE BAGGING APPARATUS

This application is a continuation application Ser. No. 08/124,078, filed Sep. 21, 1993 now abandoned.

FIELD OF THE INVENTION

The present invention relates to the insertion of bales of hay and the like into tubes or "bags" of protective material.

BACKGROUND

The applicants Canadian Patent 1296943, issued 10 Mar. 1992 describes a bale bagging apparatus in which the bales are passed through a tunnel of flaccid material and a shirred plastic tube is drawn off the tunnel onto the bales as they leave the tunnel. To support the tunnel in a bale feeding state, a hoop is used at the outlet end of the tunnel. The tube withdrawal from the tunnel is controlled with a loop of tubing wrapped around the outside of the tube, between the shirred main body of the tube and the outlet end.

SUMMARY

The present invention relates to certain improvements in such bale bagging, which allows the use of a tube that is a tighter fit on the bales. This reduces wind fatigue of the tube and consequently enables the use of a thinner, less expensive tube material.

According to one aspect of the present invention there is provided a bale bagging apparatus for inserting bales in sequence into a tube of plastic film, the apparatus comprising:

a collapsible tunnel through which the bales are passed in sequence; and a tube retainer comprising a flexible hoop surrounding the tunnel adjacent an outlet end thereof, the retainer having a circumference greater than that of the tube such that the tube may be placed on the tunnel in a shirred state and stretched as it is drawn off the tunnel onto a bale passing therethrough.

The collapsible tunnel allows good conformity between the bale shape and size and those of the tunnel. The use of an internal hoop as a tube retainer stretches the tube uniformly as it is pulled over the hoop, to contract once more over the bale as the bale and the tube leave the tunnel. This allows the use of a tube that is nominally of the same circumference as the bales being bagged. In consequence, the tube is a very tight fit on the bale and is subject to very little wind fatigue.

In preferred embodiments, the tunnel is fabricated from a plurality of overlapping panels of flexible, self-supporting material. Preferably plastic sheets. These may be pressed tightly against the bales without generating excessive frictional resistance to bale passage through the tunnel. At the same time, the tube is easily supported on the tunnel and may be drawn uniformly, with uniform stretch, over the retaining hoop at the end of the tunnel.

According to another aspect of the present invention there is provided a method of bagging bales in a plastic tube of substantially the same circumference as the bales, said method comprising:

a) passing the bales in sequence through a collapsible tunnel;

b) collapsing the tunnel to conform closely to the size and shape of the bales as they pass therethrough;

c) supporting the plastic tube on the tunnel in a shirred state;

d) drawing the tube over a flexible hoop surrounding the tunnel adjacent the outlet end of the tunnel, the hoop having an outer circumference greater than the circumference of the tube; and e) releasing the tube from the hoop onto the bales as the bales exit the tunnel.

An embodiment of the bale bagger, illustrating the bale bagging method, is described in the following.

BRIEF DESCRIPTION OF THE DRAWINGS

In the accompanying drawings, which illustrate an exemplary embodiment of the present invention.

DETAILED DESCRIPTION

Figure 1:
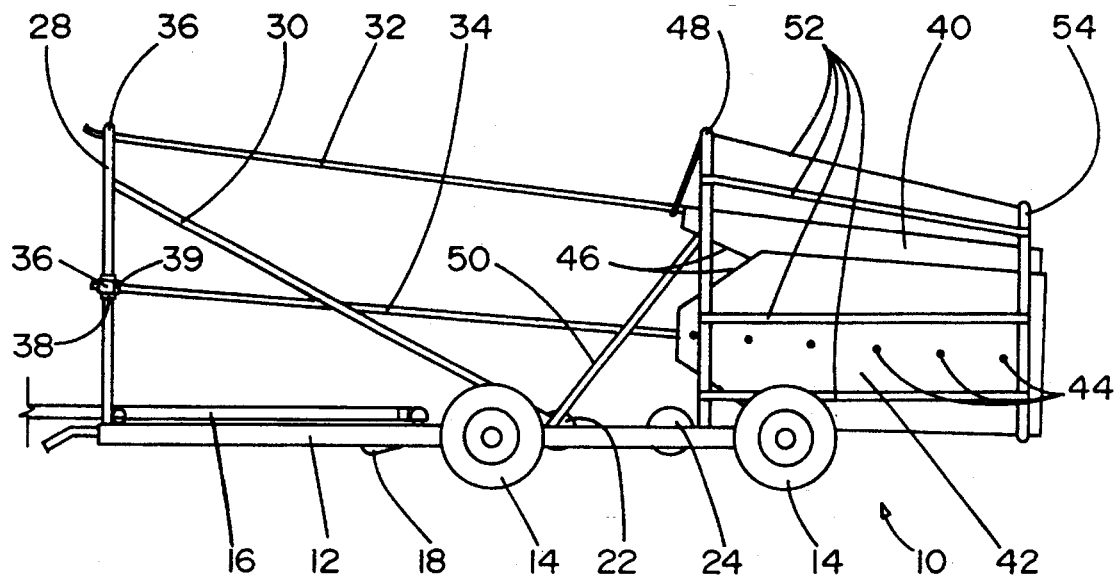
FIG. 1 is a side view of a bale bagger according to the present invention.
Figure 2:
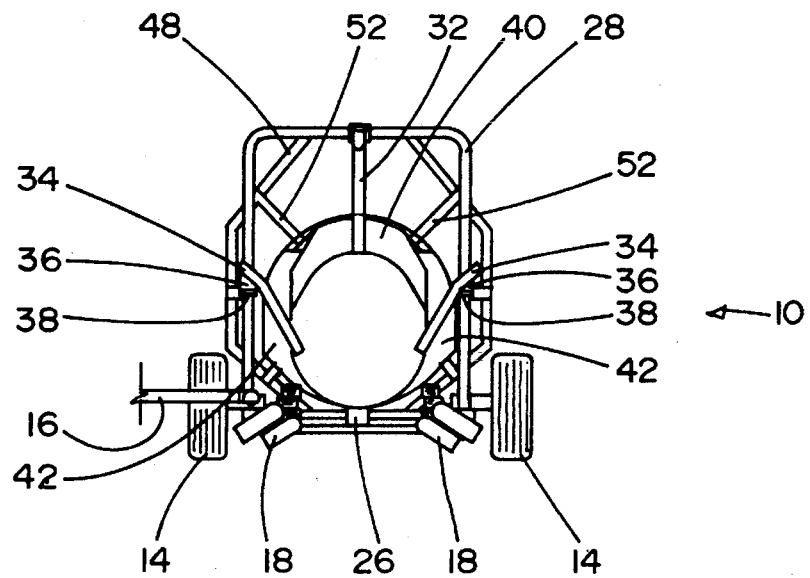
FIG. 2 is a front view of the bale bagger.
Figure 3:
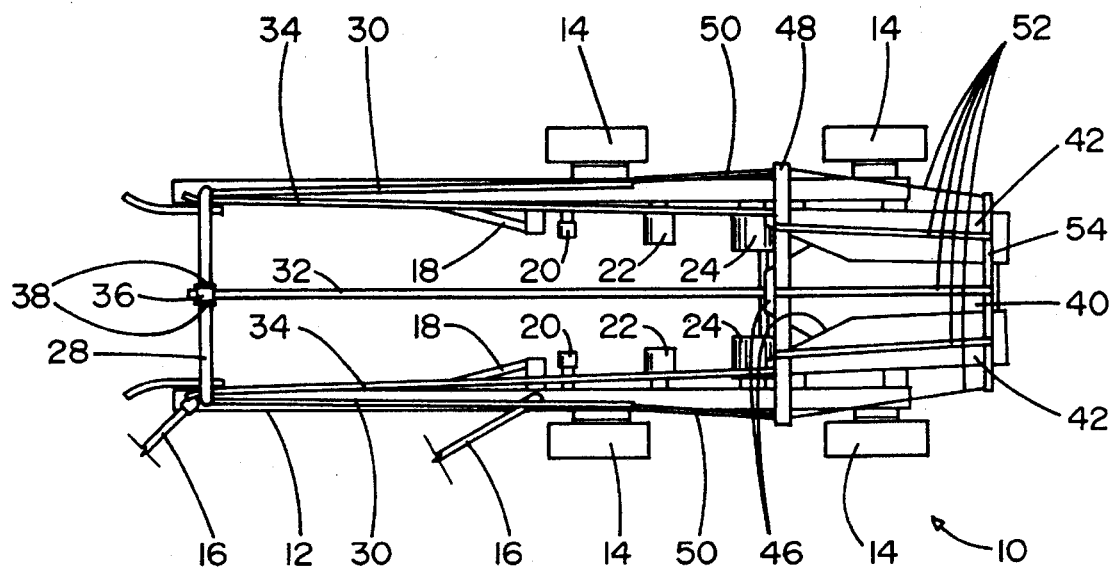
FIG. 3 is a top view of the bale bagger.
Figure 4:
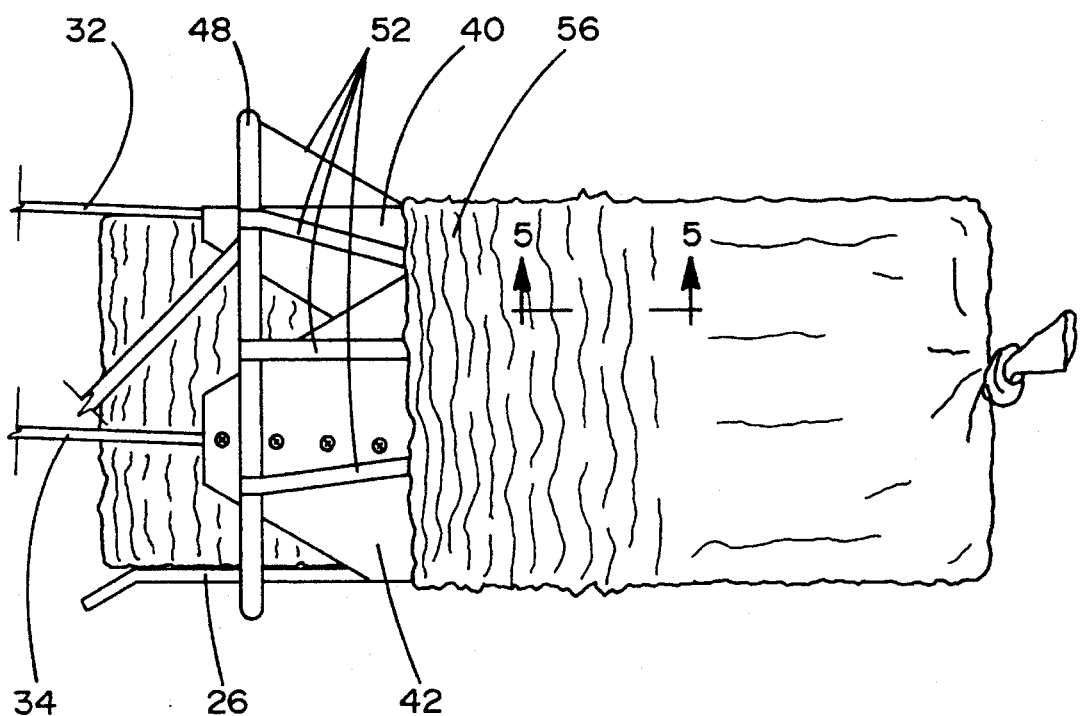
FIG. 4 is a enlarged partial view of the bagger.
Figure 5:
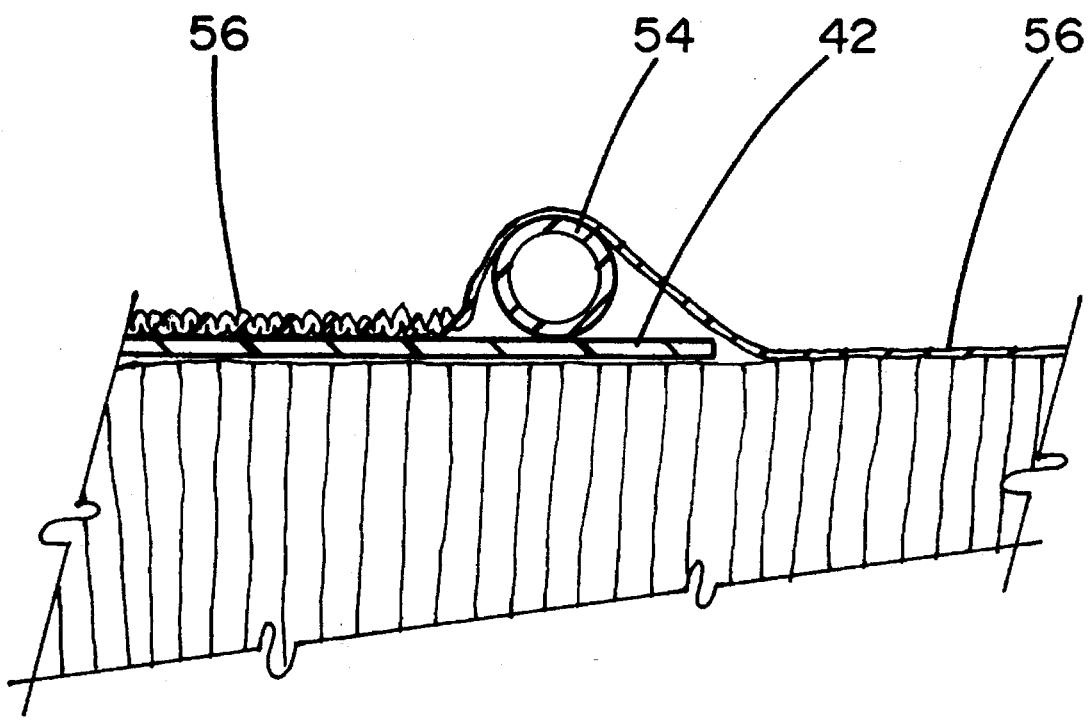
FIG. 5 is detailed cross sectional view along line 5—5 of FIG. 4.

Referring to the accompanying drawings, there is illustrated a bale bagging apparatus 10 with a frame 12 supported on four wheels 14. The apparatus is towed by a tow bar 16 connected to one side or the other of the frame. This arrangement, and the adjustable mounting of the wheels of the frame is as described in my earlier Canadian Patent 129943 and will not be described in further detail.

Two bale lifting arms 18 that converge rearwardly are located at the front of the frame, in the center. The lifting arms slope upwardly towards respective series of three rollers 20, 22 and 24. The two series of rollers are located on opposite sides of the frame. They extend from the lifting arms towards a bale support pan 26 that extends through a bagging section of the apparatus. The rollers 20, 22 and 24 are of increasing diameter towards the rear of the apparatus.

Mounted on the frame 12, near the front, is a front arch 28. This is braced against the frame by two angle stays 30. The arch is generally rectangular in shape. At the top, in the center, it is connected to a top tunnel arm 32, while two side tunnel arms 34 are connected to the respective vertical sides of the arch. Each arm extends from the arch to the rear end of the apparatus. It is mounted on the tubular arch by a sleeve 36 which is prevented from sliding along the arch by stops 38. The side tunnel arms 34 are connected to the sleeves by pins 39 so that the tunnel arms may pivot vertically as well as horizontally.

Near the back end of the apparatus the top tunnel arm 32 is fixed to a top tunnel panel 40, while the side tunnel arms are connected to respective side tunnel panels 42. Each panel is made from a sheet of flexible, self-supporting plastic material. It is secured to the outside of the respective tunnel arm by a row of fasteners 44. Each of the panels has a tapered leading end 46.

Near the front of the panels 40 and 42 is a rear arch 48. This is supported in place by two angle stays 50. A series of straps 52 extend from the rear arch towards the rear end of the apparatus and are connected to a flexible hoop 54 that surrounds the panels 40 and 42 and the rear end of the bale support pan 26. The hoop is made from a flexible tube of a circular cross section with its ends joined.

In use of the apparatus, a tube 56 of plastic film is placed around the three panels 40 and 42 and the pan 26, between the hoop 54 and the rear arch 48. The tube is positioned over the straps 52. When the apparatus is then driven up to a row of bales to be bagged, the arms 18 engage the bales, and lift them onto the rollers 20, 22 and 24, over which they pass into the collapsible tunnel defined by the panel 40, the two panels 42 and the support pan 26. The panels and the pan overlap at their edges so that the shirred tube 56 is maintained out of contact with the bales as they pass through the tunnel. The bales open the tunnel, with the flexible panels adopting the size and shape of the bales.

The tube 56 is intended to have the same circumference as the bales to be bagged, so that there is no looseness in the tube while it is placed onto the bales. Consequently, the tube holds the panels 40 and 42 tightly against the side of the bale as it passes through the tunnel.

As with the earlier machine, the end of the tube is initially pulled over the end of the tunnel and tied together to form an end of a bag into which the bales are deposited as they pass through the tunnel. In this case, the tube is drawn over the hoop 54. This stretches the bag uniformly around its circumference and allows the bag to contract uniformly around the bale as both the tube and the bale leave the tunnel. The shirred portion of the bag is retained on the tunnel by the hoop and the stretching action that is exerted on the tube.

While one embodiment of the present invention has been described in the foregoing, it is to be understood that other embodiments are possible within the scope of the invention. The details of the mounting of the tunnel panels 40 and 42, for example, may be varied considerably. While the illustrated embodiment is preferred because a bale entering the apparatus will cause the tunnel arms to spread to the desired positions, other arrangements are possible, including an arrangement with the panels pivotally mounted on the rear arch. The invention is therefore to be considered limited solely by the scope of the appended claims.

I claim:

1. A bale bagging apparatus for bagging end to end a plurality of preformed, round bales having a common nominal bale circumference, the apparatus comprising:

a collapsible, annular tunnel having an inlet end and an outlet end, through which tunnel the bales are passed in sequence in a direction of bale movement from the inlet end to the outlet end, said tunnel comprising a plurality of panels arranged side-by-side in an overlapping, annular array and panel mounting means mounting each of the panels for substantially independent movement towards and away from bales passing through the tunnel;

whereby when a shirred tube of plastic film surround the tunnel, the tube having an unstretched circumference substantially the same as the nominal bale circumference, the tube causes the tunnel to conform closely to the bales in size and shape as the bales pass through the tunnel; and a tube retainer comprising a flexible hoop surrounding the tunnel adjacent the outlet end thereof, the retainer having a fixed circumference greater than the unstretched circumference of the tube and independent of the circumference of the tunnel adjacent the outlet end thereof, whereby the tube is stretched over the tube retainer as it is drawn off the tunnel onto a bale passing therethrough.

2. An apparatus according to claim 1 wherein the panels comprise a flexible, self-supporting material.

3. Apparatus according to claim 2 wherein the panels are plastic material.

4. Apparatus according to claim 2 wherein the tunnel further comprises a support pan for supporting bales passing through the tunnel, the pan being arranged between two adjacent ones of the panels.

5. Apparatus according to claim 2 wherein the panel mounting means mount the panels for pivotable movement towards and away from one another.

6. Apparatus according to claim 5 wherein the panel mounting means comprise elongate panel supports secured to respective ones of the panels and pivotably mounted on the apparatus at positions spaced from the inlet end of the tunnel in a direction opposite the direction of bale movement.

7. Apparatus according to claim 6 wherein the panel mounting means include an arch spaced from the inlet end of the tunnel, and means pivotally mounting the panel supports on the arch.

8. Apparatus according to claim 7 wherein the tunnel consists of three panels, each of which is arcuate in cross section transversely of the direction of bale movement.

9. Apparatus according to claim 1 wherein the tube retainer includes tether means connected to the hoop and to the apparatus upstream of the hoop for retaining the hoop on the tunnel.

10. Apparatus according to claim 1 including bale pickup means comprising pickup arms engageable with opposite sides of a bale and sloping upwardly toward the inlet end of the tunnel and a plurality of rollers between the pickup arms and the tunnel to support bales passing from the pickup arms to the tunnel.

11. Apparatus according to claim 1 wherein the apparatus comprises a wheel supported frame.

12. Apparatus according to claim 11 wherein the apparatus comprises a tow bar.

* * * * *